US006961324B2

(12) United States Patent
Kilgore

(10) Patent No.: US 6,961,324 B2
(45) Date of Patent: Nov. 1, 2005

(54) SYSTEM AND METHOD FOR INTERLEAVING COMPRESSED AUDIO/VIDEO (A/V) DATA FRAMES

(75) Inventor: Brian Kilgore, Melbourne, FL (US)

(73) Assignee: IPR Licensing, Inc., Wilmington, DE (US)

(*) Notice: Subject to any disclaimer, the term of this patent is extended or adjusted under 35 U.S.C. 154(b) by 447 days.

(21) Appl. No.: 09/847,859

(22) Filed: May 2, 2001

(65) Prior Publication Data

US 2002/0186672 A1 Dec. 12, 2002

(51) Int. Cl.$^7$ .................................................. H04H 1/00
(52) U.S. Cl. ......................... 370/329; 370/352; 370/466
(58) Field of Search ........................... 370/329, 352, 370/351, 353, 354, 357, 466, 216, 229, 278, 216 U, 465, 473, 474, 228, 230, 356, 348, 36 E, 386, 461, 478, 437, 447, 462; 348/461–468; 375/240.01, 240.02, 240.26, 240.27, 240.12

(56) References Cited

U.S. PATENT DOCUMENTS

| | | | |
|---|---|---|---|
| 5,644,576 A | 7/1997 | Bauchot et al. | 370/437 |
| 5,771,239 A | 6/1998 | Moroney et al. | 370/474 |
| 5,777,990 A | 7/1998 | Zehavi et al. | 370/335 |
| 5,784,528 A | 7/1998 | Yamane et al. | 386/112 |
| 5,881,053 A | 3/1999 | Kimball | 370/260 |
| 5,884,004 A | 3/1999 | Sato et al. | 386/98 |
| 5,905,845 A | 5/1999 | Okada et al. | 386/98 |
| 5,914,988 A | 6/1999 | Hu et al. | 375/341 |
| 5,926,500 A | 7/1999 | Odenwalder | 375/200 |
| 5,930,230 A | 7/1999 | Odenwalder et al. | 370/208 |
| 6,005,855 A | 12/1999 | Zehavi et al. | 370/335 |
| 6,091,947 A | 7/2000 | Sumner | 455/413 |
| 6,181,872 B1 | 1/2001 | Yamane et al. | 386/112 |
| 6,201,970 B1 | 3/2001 | Suzuki et al. | 455/450 |
| 6,246,883 B1 * | 6/2001 | Lee | 455/507 |
| 6,353,635 B1 * | 3/2002 | Montague et al. | 375/240.26 |
| 6,421,387 B1 * | 7/2002 | Rhee | 375/240.27 |
| 6,496,477 B1 * | 12/2002 | Perkins et al. | 370/228 |
| 6,512,751 B1 * | 1/2003 | Struhsaker et al. | 370/329 |

* cited by examiner

Primary Examiner—William Luther
(74) Attorney, Agent, or Firm—Hamilton, Brook, Smith & Reynolds, P.C.

(57) ABSTRACT

Streaming audio and video (A/V) transmissions have become commonplace due to increasing data rates available over modem computer networks, and should occur at real-time or near real-time so that the user perceives an intelligible audio or video image. Lost or late frames can result in interference or distortion, and may be perceived as a "blip" or "pop" in the output sound or image. Wireless networks are particularly susceptible to such interference. Interference can be reduced by receiving a stream of symbols, arranging the symbols in a series of frames, and interleaving the symbols in one of the frames with symbols in an adjacent one of frames in the series of frames. In this manner, a frame that is dropped or arrives late over the wireless communication link will result in less distortion because some of the symbols will be available from the adjacent frames.

29 Claims, 6 Drawing Sheets

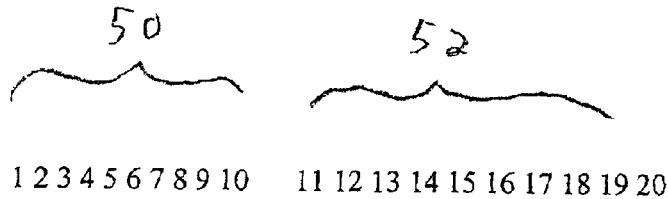

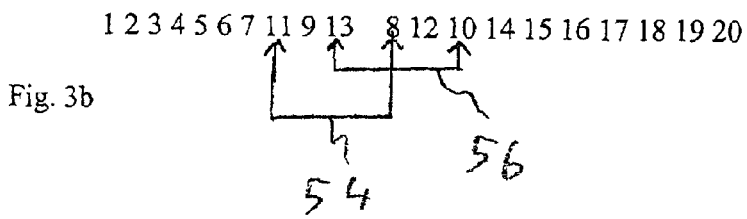

| Original Packets: | 58a | 60a | 62a | |
|---|---|---|---|---|
| Packet 1: | Packet 2: | Packet 3: | Packet 4: | Packet 5: |
| STUVWXYZ | 01234567 | 89ABCDEF | GHIJKLMN | OPQRSTUV |

| Sent Packets: | 58b | 60b | 62b | |
|---|---|---|---|---|
| Packet 1: | Packet 2: | Packet 3: | Packet 4: | Packet 5: |
| ?T?V0X2Z | W1Y385A7 | 496BGDIF | CHEJOLQN | KPMR?T?V |
| (Where "?" are codewords from other adjacent packets | | | | |

Now if packet 3 is lost the packets would be:

| Received Packets: | 58c | 60c | 62c | |
|---|---|---|---|---|
| Packet 1: | Packet 2: | Packet 3: | Packet 4: | Packet 5: |
| STUVWXYZ | 0123.5.7 | 8.A.C.E. | .H.JKLMN | OPQRSTUV |
| (Where "." are lost codewords). | | | | |

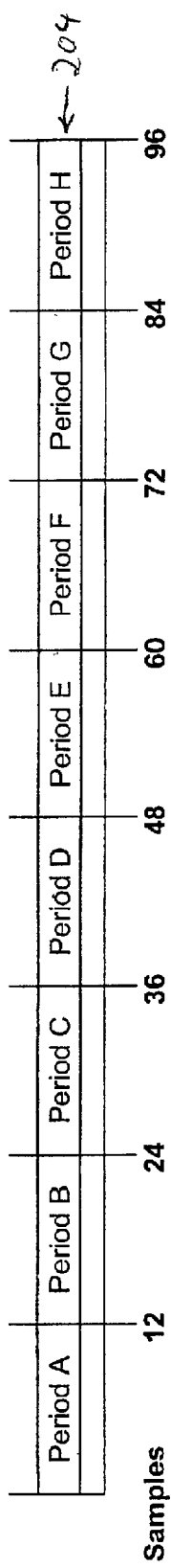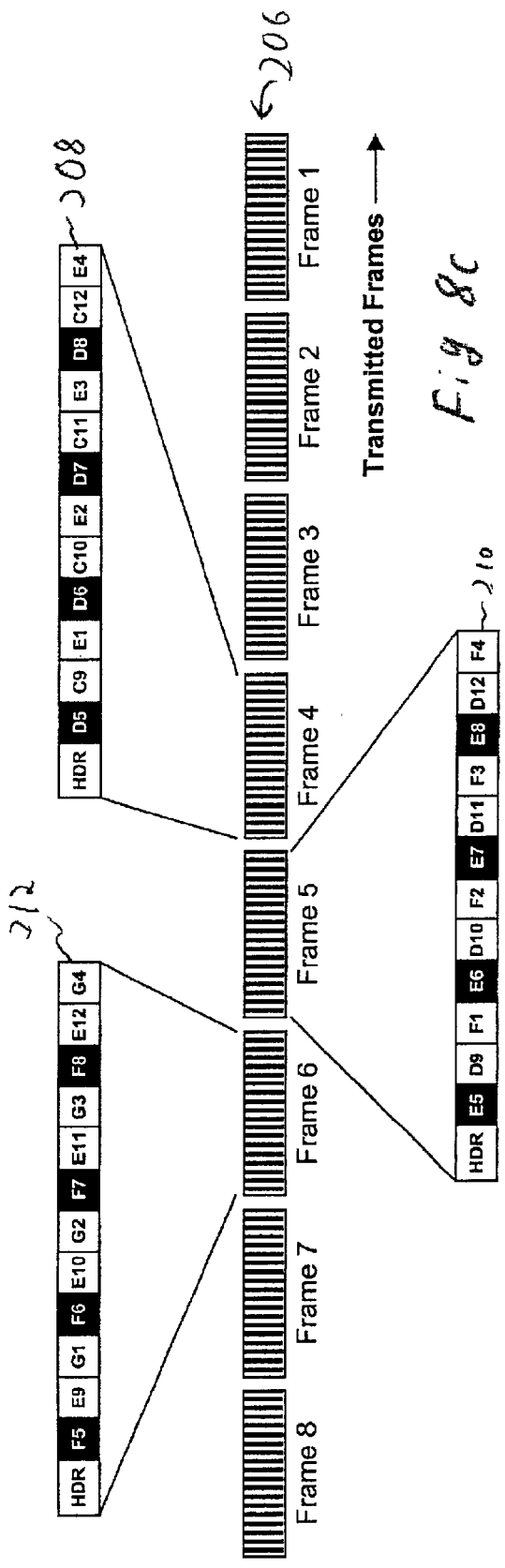
Fig. 8b
Fig. 8c

SYSTEM AND METHOD FOR INTERLEAVING COMPRESSED AUDIO/ VIDEO (A/V) DATA FRAMES

BACKGROUND OF THE INVENTION

Streaming audio and video (A/V) transmissions have become commonplace due to computer networks which are able to carry the digital A/V data at a rate sufficient to provide a user with a real time audio or video output image. Streaming transmissions should occur at real-time or near real-time so that the user perceives an intelligible audio or video image. Such streaming transmissions occur in a series of frames, in which each frame contains symbols indicative of a particular audio or video signal. The symbols are output, or played back, to the user in sequence from the frame. Each frame, therefore, represents a predetermined time interval of playback. Lost or late frames, while not fatal to transmissions, are perceived as a "blip" or "pop" for the duration, or interval, of the frame. Accordingly, sufficient frames should be received in a particular timeframe in order to satisfy the aggregate interval they represent i.e. an average of one frame per time interval represented by that frame.

In a wireless network, the frames are transmitted via a radio frequency (RF) medium according to a particular protocol, such as IS_95 or others. However, wireless networks tend to exhibit different performance characteristics than their wired network counterparts. In particular, wireless networks have higher rates of lost or late packets due to interference and other factors which affect propagation of the RF signals. Accordingly, wireless networks typically employ a plurality of shared RF channels among multiple users, in which a plurality of wireless connections are shared over the same wireless channel. The channels are switched, or multiplexed, among the multiple wireless connections according to a predetermined protocol, such Code Division Multiple Access (CDMA), Time Division Multiple Access (TDMA), or Frequency division multiple access (FDMA).

In the case of streaming A/V transmissions, such sharing occurs at a rate sufficient to provide transmission of the frames according to the time interval represented by the frame. While transmissions such as email can be transmitted over time, aggregated, and presented to a user after complete reception, streaming, real-time audio or video should be received according to the predetermined rate so that the output image perceived by the user is intelligible, and not prone to "blips" and "pops."

It would be beneficial, therefore, to interleave symbols in one frame with symbols in an adjacent frame so that, in the case of lost or late packets, the duration of the interval during which no symbols are available for playback is reduced.

SUMMARY OF THE INVENTION

Streaming data such as compressed audio and video can result in interference or distortion in the output sound or image. Wireless networks are particularly susceptible to such interference. A method for transmitting A/V data signals in a wireless network minimizes such interference by receiving a stream of A/V data signals, each of the data signals corresponding to a particular symbol or data item in the stream, arranging the symbols in a series of frames, and interleaving the symbols in one of the frames with symbols in an adjacent one of frames in the series of frames. In this manner, a frame that is dropped or arrives late over the wireless communication link will result in less distortion because some of the symbols will be available from the adjacent frames.

Each frame includes a predetermined number of symbols corresponding to an interval in the audio or video image carried in the stream. When a frame is dropped, the interval is output as distortion, and may be perceived as a "blip" or "pop" in the output sound or image for the duration of the interval. Interleaving symbols from adjacent frames reduces the interval in which no symbols are available for playback.

Depending on the level of interference occurring over the wireless link between a base station processor and a subscriber access unit, the number of interleaved symbols spread between adjacent frames may be varied to result in an optimal output audio or video signal perceived by a user. The number of symbols may be spread as determined by a predetermined spreading computation metric according to the interference level. The interference level may be determined by link transmission characteristics, such as protocol type, bit error rate (BER), signal-to-noise ratio (SNR), framing marker, sampling rate, and others. Further, the spreading level may be dynamically recomputed as the interference level changes, such as movement of the mobile user or changes to the wireless transmission rate of other users.

Interleaving occurs prior to transmission, in which the symbols in a frame are switched with corresponding symbols in an adjacent frame in the stream. The predetermined spreading computation determines which symbols are to be switched. The frames are then transmitted over the wireless link. As the frames are received, the symbols are de-interleaved by an inverse spreading computation which restores the previous series of frames and symbols therein. Further, each frame may carry a header bitmap corresponding to an adjacent frame which indicates which symbols in the frame are to be switched with the adjacent frame.

BRIEF DESCRIPTION OF THE DRAWINGS

FIGS. 3a and 3b show symbol interleaving in data packets;

FIG. 4 shows an example of symbol interleaving;

FIGS. 8a–8c show an alternate embodiment of interleaving.

Figure 1:
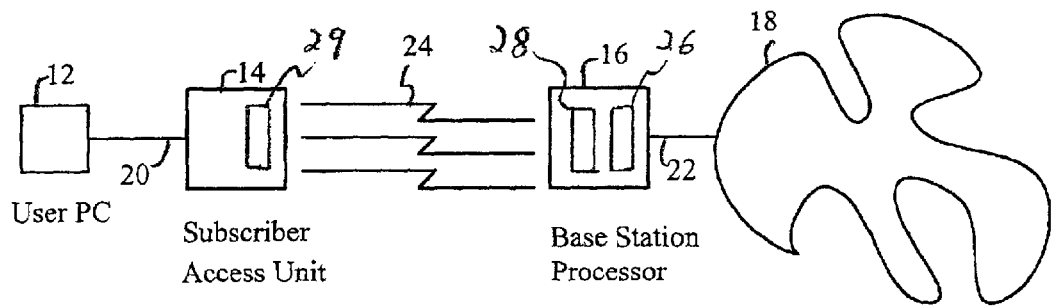
FIG. 1 shows a wireless communication system operable for symbol interleaving as described herein.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

FIG. 1 shows a wireless communication system operable for symbol interleaving. Referring to FIG. 1, a user PC 12 or other access point into a user computer system or local area network is in communication with a subscriber access unit 14 via a wireline connection 20. The wireline connection 20 may be any suitable wired medium such as TCP/IP, Ethernet, or direct connection. The subscriber access unit 14 is in communication with a wireless transceiver, such as the base station processor 16, via a wireless link 24, and is operable to transmit wireless messages in an RF medium between the subscriber access unit 14 and the base station processor 16. The base station processor 16 is connected to the Internet 18 or other public access network via the Internet connection 22. The Internet connection 22 may also be any suitable wired line connection, such as TCP/IP, UDP/IP, Ethernet, T1 line, POTS (plain old telephone system) or other wired medium. An end user at the user PC 12 may therefore receive data from the Internet 18 via the wired connections 20, 22 and wireless links 24 supported by the base station processor 16 and the subscriber access unit 14.

Figure 2A:
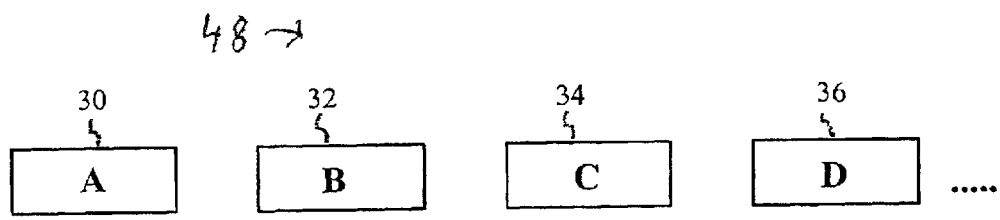
FIG. 2a shows a prior art transmission stream.

FIG. 2a shows a prior art A/V transmission stream. Referring to FIG. 2a, the transmission stream 48 includes four frames 30, 32, 34, and 36, containing symbol sequences A, B, C and D, respectively. Four frames are shown as exemplary; a typical stream may have many more frames. Each of the symbols in the sequence is played back to the user as a portion of an audio or video image. The number of frames depends on the number of symbols per frame. The number of symbols required depends on the quality of the output image desired. In one embodiment, approximately 44,000 symbols are required to produce 1 second of CD quality audio. Telephone quality voice can be produced employing only 8000 symbols per second.

Figure 2B:
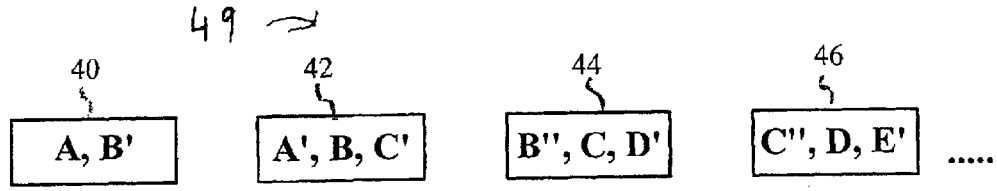
FIG. 2b shows a transmission stream employing symbol interleaving.

FIG. 2b shows the streaming transmission of FIG. 2a interleaved according to the invention as defined by the present claims. Referring to FIG. 2b, a transmission stream 49 is shown containing four frames 40, 42, 44, and 46 are shown. The data in the packets, however, is arranged as follows. Frame 40 contains symbols from set A, and also some interleaved symbols from set B denoted as B'. Frame 42 contains data from set B, and also some of the symbols from set A, denoted as A', and from set C, denoted as C', interleaved with the symbols from B. Note that symbols from set A included in A' are not contained in A, and, similarly, symbols from sets B' and C' are not included in B and C, respectively. Frame 44 contains other interleaved symbols from B, denoted as B", symbols from C, and some interleaved symbols from D, shown by D'. Frame 46 contains symbols from D, interleaved with symbols C" and E'. Interleaved symbols in this manner continue, as shown by E'. The first and last frames in a stream may be interleaved only with one frame, or may include null symbols as placeholders.

Referring again to FIG. 1, the system will now be described in more detail. A frame generator 26 receives the A/V signal stream and generates a series of frames containing the symbols. A symbol interleaver 28 interleaves the symbols in adjacent groups of packets to produce the interleaved frames. After transmission over the wireless link 24, a symbol de-interleaver 29 in the subscriber access unit 14 de-interleaves the frames using an inverse of the interleaving operation, resulting in the original sequence of frames. Note further that although the interleaving is shown as occurring at the base station processor 16 and the de-interleaving occurring at the subscriber access unit 14, interleaving in the reverse direction may also be performed, thus interleaving at the subscriber access unit 14 and de-interleaving at the base station processor 16.

FIGS. 3a and 3b shows two adjacent frames before and after interleaving. Referring to FIGS. 3a and 3b, two frames 50 and 52 are shown. Each adjacent frame 50 and 52 contains ten symbols, 1–10 and 11–20, respectively. Before interleaving, each symbol is in the positions shown in FIG. 3a. In FIG. 3b, however, two symbols are interleaved with symbols from the adjacent frame. The symbol in position 8, in frame 50 is interleaved, or switched, with the symbol in position 11, in frame 52, as shown by the arrow 54. Similarly, the symbol in position 10, in frame 50, is interleaved with the symbol in position 13, in frame 52, as shown by the arrow 56.

FIG. 4 shows an example of symbol interleaving. Referring to FIG. 4, a stream of frames 64 is shown, including frames 58a, 60a, and 62a. Two symbols from each of frames 58a, 60a, and 62a are interleaved with symbols from an adjacent frame to form an interleaved stream 66, including interleaved frames 58b, 60b, and 62b. The interleaved stream 66 is then transmitted, however, the interleaved frame 60b is lost during transmission. However, when the frames are de-interleaved to produce the playback stream 68, symbols that were initially in frame 60a in the original stream 64 were carried in adjacent frames 58b and 62b. Accordingly, the symbols 8, A, C, E are available for playback in de-interleaved frame 60c.

Since the frame 60b was lost, the playback frame 60c must be recreated to the extent possible from the available symbols in adjacent transmitted frames. Symbols 8 and A are available in transmitted frame 58b, and symbols C and E are available in transmitted frame 62b. The remaining symbol locations in playback frame 60c remain as null or otherwise padded, so as to minimize, or "smooth out" any interruption in the playback output.

Therefore, continuing to refer to FIG. 4, there is only a one symbol interval of playback during which no symbols are available. If there had been no interleaving, all of the symbols in frame 60a would not be available for playback, resulting in an eight-symbol interval during which no output is produced. While some interleaved symbols originally in frames 58a and 62a, specifically 4, 6, G, and I, were also lost in packet 60b, there is still no longer than one symbol interval during which no symbols are available for playback, as shown in stream 68.

Figure 5A:
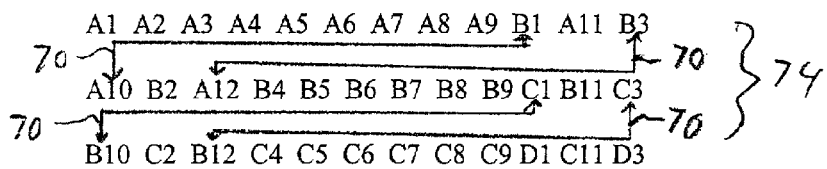
FIGS. 5a and 5b show dynamic spreading of interleaving symbols.
Figure 5B:
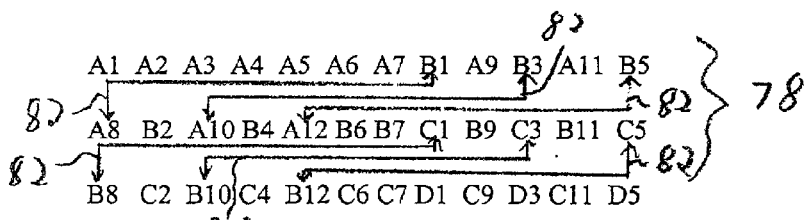

FIGS. 5a and 5b show dynamic spreading of symbols. FIG. 5a shows a level of spreading using two symbols, and FIG. 5b shows spreading using three symbols. A greater level of spreading requires more processing, but reduces the effect of a lost packet. Accordingly, the spreading level may be adjusted depending on the quality of a particular wireless link. The quality of the link may be determined by observing parameters such as protocol type, bit error rate (BER), signal-to-noise ratio (SNR), framing marker, and sampling rate. For example, table I illustrates one method of spreading level based on bit error rate. Table I is exemplary; other spreading metrics may also be developed encompassing other observed parameters.

TABLE I

| BIT ERROR RATE | SPREADING LEVEL |
| --- | --- |
| $10^{-6}$ | 2 |
| $10^{-5}$ | 3 |
| $10^{-4}$ | 4 |
| $10^{-3}$ | 5 |

Referring to FIG. 5a, a stream of frames 70 is interleaved to create an interleaved stream 74, as shown by arrows 70, defining the interleaving of two symbols. Referring to FIG. 5b, a stream of frames 76 is interleaved to create interleaved stream 78, as shown by arrows 82. In this manner, the spreading level may be adjusted to an optimal level based on the link transmission quality.

In addition to varying the spreading level, the positionally specific determination of which symbols to interleave maybe varied. In FIG. 5a, the symbols in positions 10 and 12 in one packet are interleaved with the symbols in positions 1 and 3 in an adjacent frame, respectively. In FIG. 5b, the symbols in positions 8, 10, and 12 are interleaved with symbols in positions 1, 3 and 5 in an adjacent frame.

Figure 6:
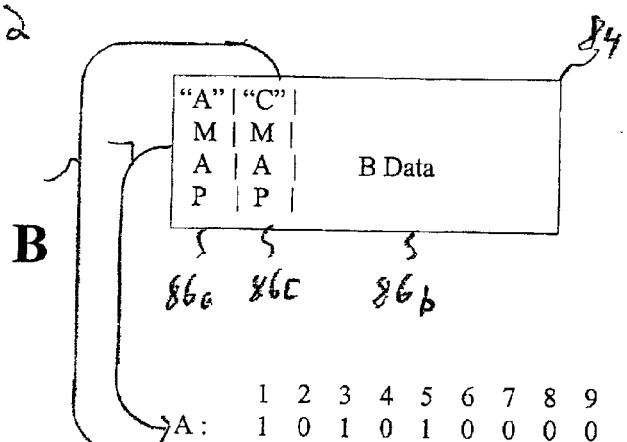
FIG. 6 shows packet mapping of interleaved symbols.

FIG. 6 shows a frame mapping of symbols to determine which symbols to interleave. Referring to FIG. 6, a frame 84 is shown, indicative of a frame B. The frame has two map portions 86a and 86c, and a payload data portion 86b. The map portions contain bitmaps 88a and 88c. The bit positions in the bitmaps correspond to symbols to interleave. A binary "1" in a bitmap indicates a symbol position that is to be interleaved, and a binary "0" in a bit position indicates a symbol position which is not to be interleaved.

The frame 84 is adjacent to two frames A and C, as depicted in FIG. 1, corresponding to each of the bitmaps 86a and 86c, respectively. The "A" map 88a indicates that symbol positions 1, 3, and 5 in frame 84 should be interleaved with symbols in A. Similarly, the "C" map 88c indicates that bit positions 8, 10, and 12 of frame 84 should be interleaved with symbols in C. Frames A and C (not shown) would also have bitmaps for the adjacent frames to indicate symbols to be interleaved. While these need not be the same position, adjacent frames should indicate the same number of symbols to interleave, otherwise some symbols would need to be dropped. In this manner, both the number and position of the symbols to be spread may be dynamically modified because each frame 84 carries a map portion 86a and 86c to indicate the spreading level and symbol interleaving positions.

Figure 7:
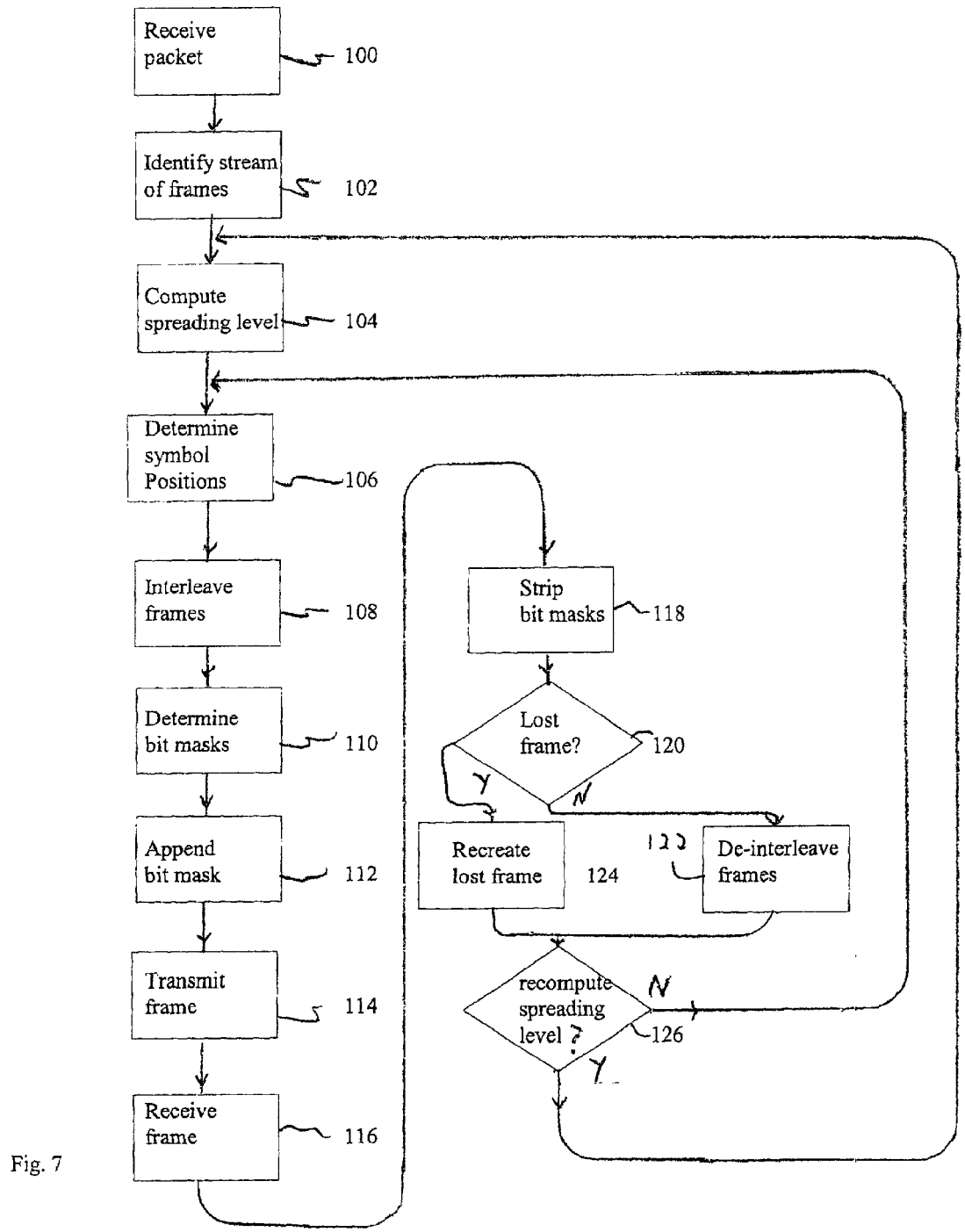
FIG. 7 shows a flowchart of interleaving and dynamic spreading.

FIG. 7 shows a flowchart of interleaving and dynamic spreading. Referring to FIG. 7, a packet is received, as shown at step 100. The transmission is identified as a stream of packets, or frames, as shown at step 102. A packet may be identified as a stream of frames, for example, by examining the port number in the TCP/IP header. A spreading level is computed depending on an expected error rate, as described above, as depicted at step 104. The symbol positions to be interleaved in each adjacent frame are determined, as shown in step 106. In the case of the first or last frame, interleaving would be performed with null symbols or performed with only the one adjacent frame, as described above. The frame is then interleaved with the corresponding symbols in the adjacent frames, as depicted at step 108. A bit mask for the preceding and succeeding frames is determined, as disclosed at step 110. The bit masks are then appended to the frame, as depicted at step 112, and the frame is transmitted over the wireless link, as shown at step 114. When the frame is received, as shown at step 116, the bit masks are stripped from the frame, as disclosed at step 118. A check is performed to determine if there was a frame loss, as shown at step 120. In the case of a lost frame, the current frame would be out of sequence with the previous frame received, and indicate that the predecessor to the current frame was lost. If the frame is in sequence with pervious frame received, then no frames were lost, and the symbols are de-interleaved with the predecessor frame, as depicted at step 122. If a frame was lost, the lost frame is partially recreated from the current frame and the last frame received, as shown in step 124, and described above with respect to FIG. 4. If more than one frame in the sequence was lost, than the frame may be recreated only with the current frame since the previous frame received does not contain symbols from the lost predecessor frame in the stream. A check is performed to determine if the spreading level needs to be recomputed, as disclosed at step 126. The spreading level maybe recomputed in the case of a triggering event, such as a time interval, a change in error rate, or a change in the number of subscriber access units which are active. If the spreading level needs to be recomputed, control reverts to step 104, otherwise control reverts to step 106 and interleaving continues at the same spreading level.

Figure 8A:
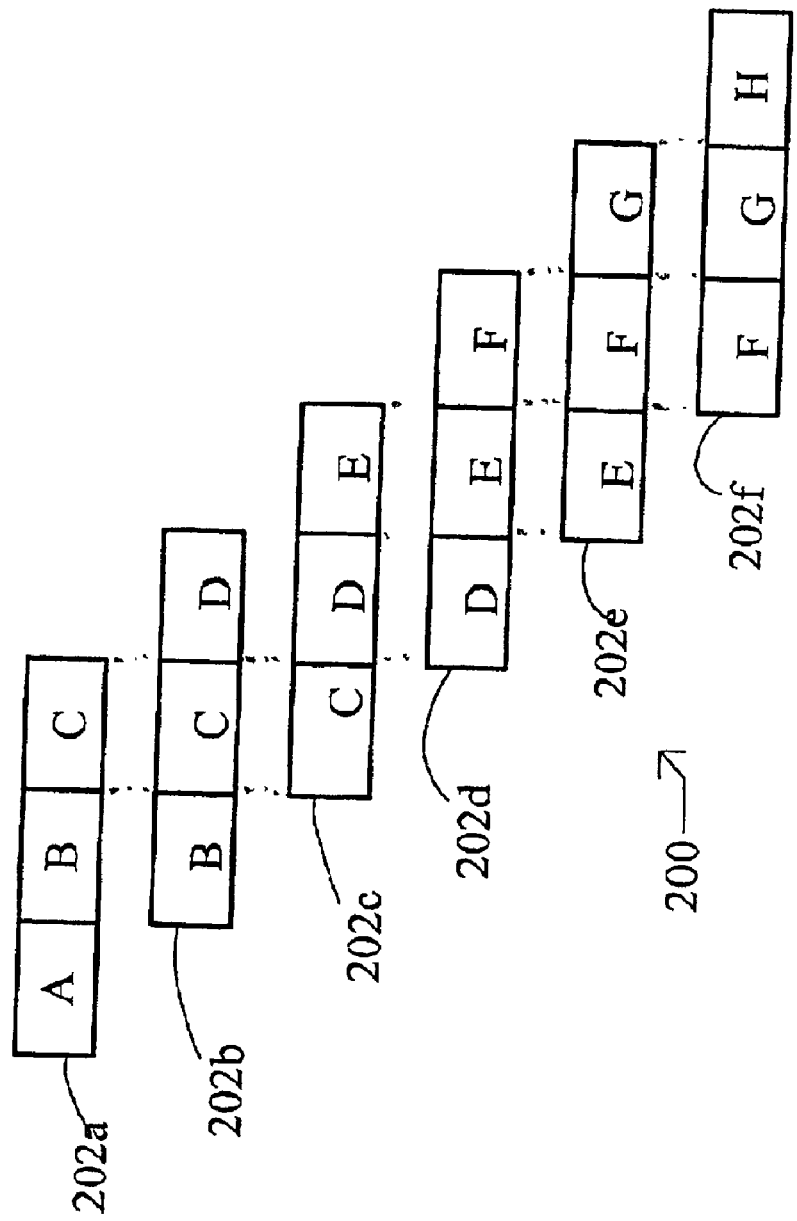

FIGS. 8a–8c illustrate another embodiment in which all the symbols from a particular number of frames are interleaved such that each interleaved frame contains an equal number of symbols from adjacent frames, also called uniform interleaving. Referring to FIG. 8a, this embodiment can be viewed as a cascade of frames 200, in which each transmitted frame 202a–202f includes ⅓ of the symbols from the adjacent frames. Therefore, each group of three frames in a stream of frames will be transmitted as three interleaved frames, in which each transmitted frame contains one-third of each frame from the group of three from the stream. If each frame holds exactly n samples, and we wish to spread the n samples across m frames, than each frame contains n/m samples from each of the m sample periods, assuming n is evenly divisible by m. Note that, as described above, the first and last frames in the stream would interleave only prior or subsequent frames, or would pad with nulls.

Referring to FIGS. 8b and 8c, an example of interleaving is shown. In this example, there is a 20 ms sample period and interleaving is spread over sets of 3 frames in the stream. Each frame holds 12 symbols, and is transmitted as a stream 204 over eight periods A–H. Since spreading occurs over three frames, each transmitted frame holds ¹²⁄₃=4 symbols from each of the three frames in the set. For each period, an interleaved frame 1–8 is transmitted, as shown by transmit sequence 206. Frames 4, 5, and 6 from the transmitted sequence 206 are shown expanded as 208, 210 and 212 respectively, and represent frames 202c, 202d, and 202e in FIG. 8a above. Each of frames 208, 210, and 212, corresponding to periods D, E, and F in the stream 204. Frame 210, corresponding to period E, contains symbols E5–E8, or the symbols stored in the middle four positions of period E. Similarly, frame 208 contains symbols E1–E4, and frame 212 contains symbols E9–E12. In this set of three frames, only frame E 210, having the other two frames adjacent, is fully represented. The adjacent frames 208, 212 similarly contain four symbols from each adjacent frame, corresponding to the cascading representation of FIG. 8a.

In alternate embodiments, various degrees of redundancy could be used to further improve the liklihood of recovery, such as spreading 2 frames from the stream over 3 transmitted, interleaved frames to provide duplicate symbols. Also, the size of the set over which the symbols are spread can be varied. Three frames are shown, although more could be employed and dynamically varied as per the dynamic spreading table described above.

Those skilled in the art should readily appreciate that the programs defining frame interleaving as defined herein are deliverable to a subscriber access unit and to a base station processor in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While the system and method for interleaving streaming data frames has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for transmitting streaming data signals in a wireless network comprising:
   receiving streaming data signals, each of the data signals corresponding to a particular symbol;
   arranging the symbols in a series of frames; and
   interleaving the symbols in one of the frames with symbols in an adjacent one of the frames in the series of frames, each frame having a respective bitmap stored with the frame, the bitmap indicating a symbol position that is to be interleaved.

2. The method of claim 1 further comprising:
   transmitting each of the frames to a remote receiver; and
   de-interleaving the samples at the remote receiver.

3. The method of claim 2 wherein de-interleaving restores the previous series of frames.

4. The method of claim 1 wherein interleaving further comprises interleaving using a predetermined number of symbols.

5. The method of claim 4 wherein the predetermined number of symbols to be interleaved are selected according to a predetermined spreading computation.

6. A method for transmitting A/V data signals in a wireless network comprising:
   receiving a stream of A/V data signals, each of the data signals corresponding to a particular symbol;
   arranging the symbols in a series of frames; and
   interleaving the symbols in one of the frames with symbols in an adjacent one of frames in the series of frames using a predetermined number of symbols selected according to a dynamic computation.

7. The method of claim 6 wherein the predetermined number of symbols varies as a result of link transmission characteristics.

8. The method of claim 7 wherein the link transmission characteristics are selected from the group consisting of protocol type, bit error rate (BER), signal-to-noise ratio (SNR), framing marker, and sampling rate.

9. The method of claim 1 wherein the receiving the streaming data signals further comprises receiving signals output from a vocoder.

10. The method of claim 1 wherein the streaming data signals are selected from the group consisting of compressed voice, compressed video, and Voice Over IP (VOIP).

11. The method of claim 1 wherein each of the frames contain a predetermined number of symbols.

12. The method of claim 1 further comprising recreating portions of a frame from the interleave symbols.

13. A system for transmitting streaming data signals in a wireless network comprising:
    streaming data signals, each of the data signals corresponding to a particular symbol;
    a frame generator operable to arrange the symbols into a series of frames;
    a symbol interleaver operable to interleave symbols from one of the series of frames with symbols from an adjacent series of frames; and
    each frame having a respective bitmap stored within the frame, the bitmap indicating a symbol position that is to be interleaved,
    wherein the symbol interleaver interleaves the symbol using the respective bitmap.

14. The system of claim 13 further comprising a de-interleaver at a remote receiver and operable to de-interleave the frames.

15. The system of claim 14 wherein the de-interleaver is operable to restore the previous series of frames.

16. The system of claim 14 wherein the de-interleaver is further operable to recreate portions of a frame from the interleaved symbols.

17. The system of claim 13 wherein the symbol interleaver is further operable to interleave using a predetermined number of symbols.

18. The system of claim 17 wherein the symbol interleaver is further operable to select the predetermined number of symbols according to a predetermined spreading computation.

19. A system for transmitting A/V data signals in a wireless network comprising:
    a stream of A/V data signals, each of the data signals corresponding to a particular symbol;
    a frame generator operable to arrange the symbols into a series of frames; and
    a symbol interleaver operable to interleave symbols from one of the series of frames with symbols from an adjacent series of frames using a predetermined number of symbols selected according to a dynamic computation.

20. The system of claim 19 wherein the predetermined number of symbols varies as a result of link transmission characteristics.

21. The system of claim 20 wherein the link transmission characteristics are selected from the group consisting of protocol type, bit error rate (BER), signal-to-noise ratio (SNR), framing marker, and sampling rate.

22. The system of claim 13 wherein the streaming data signals further comprise receiving signals output from a vocoder.

23. The system of claim 13 wherein the symbol interleaver is further operable to interleave s earning data signals selected from the group consisting of compressed voice, compressed video, and Voice Over IP (VOIP).

24. The system of claim 13 wherein each of the frames contain a predetermined number of symbols.

25. A computer program product having computer program code for transmitting streaming data signals in a wireless network comprising:
    computer program code for receiving streaming data signals, each of the data signals corresponding to a particular symbol;
    computer program code for arranging the symbols in a series of frames;

computer program code for interleaving the symbols in one of the frames with symbols in an adjacent one of frames in the series of frames, each frame having a respective bitmap stored with the frame, the bitmap indicating a symbol position that is to be interleaved;

computer program code for transmitting each of the frames to a remote receiver; and computer program code for de-interleaving the symbols at the remote receiver.

26. A computer data signal for transmitting streaming data signals in a wireless network comprising:

program code for receiving streaming data signals, each of the data signals corresponding to a particular symbol;

program code for arranging the symbols in a series of frames;

program code for interleaving the symbols in one of the frames with symbols in an adjacent one of frames in the series of frames, each frame having a respective bitmap stored with the frame, the bitmap indicating a symbol position that is to be interleaved;

program code for transmitting each of the frames to a remote receiver; and program code for de-interleaving the symbols at the remote receiver.

27. A system for transmitting streaming data signals in a wireless network comprising:

means for receiving a streaming data signals, each of the data signals corresponding to a particular symbol;

means for arranging the symbols in a series of frames;

means for interleaving e symbols in one of the frames with symbols in an adjacent one of frames in the series of frames, each frame having a respective bitmap stored with the frame, the bitmap indicating a symbol position that is to be interleaved;

means for transmitting each of the frames to a remote receiver; and means for de-interleaving the symbols at the remote receiver.

28. The method of claim 1 wherein the streaming data signals comprise audiovisual (A/V) data signals.

29. The system of claim 13 wherein the streaming data signals comprise audiovisual (A/V) data signals.

* * * * *

UNITED STATES PATENT AND TRADEMARK OFFICE
CERTIFICATE OF CORRECTION

PATENT NO. : 6,961,324 B2
DATED : November 1, 2005
INVENTOR(S) : Brian Kilgore

It is certified that error appears in the above-identified patent and that said Letters Patent is hereby corrected as shown below:

Column 8,
Line 54, delete "s earning" and insert -- streaming --.

Column 10,
Line 10, delete "e" and insert -- the --.

Signed and Sealed this

Tenth Day of January, 2006

JON W. DUDAS
*Director of the United States Patent and Trademark Office*